United States Patent
Chen et al.

(10) Patent No.: US 11,360,879 B2
(45) Date of Patent: Jun. 14, 2022

(54) SCRIPT DEBUGGING METHOD, DEVICE, AND COMPUTER STORAGE MEDIUM

(71) Applicant: HUAWEI TECHNOLOGIES CO., LTD., Shenzhen (CN)

(72) Inventors: Yong Chen, Wuhan (CN); Michael Mackey, Dublin (IE); Daniel Dylag, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/868,584

(22) Filed: May 7, 2020

(65) Prior Publication Data
US 2020/0264968 A1    Aug. 20, 2020

Related U.S. Application Data

(63) Continuation of application No. PCT/CN2018/105872, filed on Sep. 15, 2018.

(30) Foreign Application Priority Data

Nov. 10, 2017 (CN) .......................... 201711110788.1

(51) Int. Cl.
*G06F 11/36*     (2006.01)

(52) U.S. Cl.
CPC ................ *G06F 11/3648* (2013.01)

(58) Field of Classification Search
None
See application file for complete search history.

(56) References Cited

U.S. PATENT DOCUMENTS

| 6,434,741 | B1 * | 8/2002 | Mirani ................ G06F 11/3628 714/E11.209 |
| 7,107,578 | B1 | 9/2006 | Alpern |

(Continued)

FOREIGN PATENT DOCUMENTS

| CN | 101216802 A | 7/2008 |
| CN | 101639805 A | 2/2010 |

(Continued)

OTHER PUBLICATIONS

Oracle® JRockit JVM, "Command Line Reference R27.6", Apr. 2009, total 164 pages retrieved from : https://docs.oracle.com/cd/E13150_01/jrockit_jvm/jrockit/jrdocs/refman/optionX.html.

*Primary Examiner* — Andrew M. Lyons
(74) *Attorney, Agent, or Firm* — Maier & Maier, PLLC

(57) ABSTRACT

A script debugging method, a device, and a computer storage medium. The method includes: obtaining, by a device, a debugging instruction, where the debugging instruction carries a to-be-debugged target line breakpoint, and the target line breakpoint includes at least line information used to indicate a line of code in which a breakpoint location is located in a script file requested to be debugged; and displaying a debugging result when determining that a breakpoint debugging condition is met, where the debugging result includes information obtained by the debugger when the device performs breakpoint processing on the line of code corresponding to the target line breakpoint, and the breakpoint debugging condition includes at least that identification information corresponding to a target interface breakpoint is consistent with identification information corresponding to a target local variable.

20 Claims, 5 Drawing Sheets

(56) References Cited

U.S. PATENT DOCUMENTS

| | | | |
|---|---|---|---|
| 8,239,832 B2* | 8/2012 | Stall | G06F 11/3664 |
| | | | 717/124 |
| 8,434,057 B2 | 4/2013 | Ashish et al. | |
| 9,262,300 B1* | 2/2016 | Haba | G06F 11/362 |
| 9,804,952 B1* | 10/2017 | Cohen | G06F 11/3644 |
| 2006/0064677 A1* | 3/2006 | Bickson | G06F 11/3664 |
| | | | 717/124 |
| 2011/0307871 A1* | 12/2011 | Branda | G06F 11/3644 |
| | | | 717/129 |
| 2011/0307872 A1 | 12/2011 | Stall | |
| 2012/0047486 A1 | 2/2012 | Ashish et al. | |
| 2012/0117041 A1* | 5/2012 | Rodriguez | G06F 11/3664 |
| | | | 707/E17.032 |
| 2012/0151452 A1* | 6/2012 | Zinkovsky | H04L 65/1066 |
| | | | 709/228 |
| 2014/0344625 A1* | 11/2014 | Thatte | G06F 11/3636 |
| | | | 714/38.1 |
| 2015/0227450 A1 | 8/2015 | Brodsky et al. | |
| 2017/0270027 A1 | 9/2017 | Chan et al. | |

FOREIGN PATENT DOCUMENTS

| | | |
|---|---|---|
| CN | 102289403 A | 12/2011 |
| CN | 102495802 A | 6/2012 |
| CN | 102693183 A | 9/2012 |
| CN | 102981956 A | 3/2013 |
| CN | 102981957 A | 3/2013 |
| CN | 104077225 A | 10/2014 |
| CN | 106681897 A | 5/2017 |
| CN | 107273449 A | 10/2017 |

* cited by examiner

SCRIPT DEBUGGING METHOD, DEVICE, AND COMPUTER STORAGE MEDIUM

CROSS-REFERENCE TO RELATED APPLICATIONS

This application is a continuation of International Application No. PCT/CN2018/105872, filed on Sep. 15, 2018, which claims priority to Chinese Patent Application No. 201711110788.1, field on Nov. 10, 2017. The disclosures of the aforementioned applications are hereby incorporated by reference in their entireties.

TECHNICAL FIELD

Embodiments relate to the field of computer technologies, and in particular, to a script debugging method, a device, and a computer storage medium.

BACKGROUND

A script is an executable file programmed by using a specific descriptive language based on a particular format, and is also referred to as a macro or a batch processing file. The descriptive language is also referred to as a script language, and is a computer programming language created for shortening a conventional process of programming, compilation, linking, and running. The script may be understood as a program stored as plain text, and may include a series of computer executable operation commands. The script needs to be executed by using a script engine. Different types of scripts need different script engines. The script can be correctly compiled only when the script matches the script engine.

A specific script debugging solution provided in the prior art is: when a script engine is started, an interception interface needs to be enabled to intercept a to-be-executed debugging command; and a debugger communicates with a container in a device by using the interception interface to correspondingly debug code. It is found in practice that the interception interface is independent of, and inconsistent with, a debug interface (for example, a java debug interface) used during script debugging. Each interception interface is allowed to debug only one type of script. If a plurality of types of scripts need to be debugged at the same time, a plurality of interception interfaces need to be designed in the script engine. One type of script file corresponds to one interception interface. Different interception interfaces cannot be mutually called. In addition, the script engine further needs to have a debugging function. In this way, there are a plurality of interception interfaces in the script engine, increasing design difficulty and manpower costs. In addition, currently a plurality of script engines are provided with no debugging function. Usually, whether a problem occurs is determined through log analysis. In this manner, the problem cannot be directly located. Alternatively, subsequent research and development personnel delete a part of a script by using a dichotomy and re-execute the script to locate the problem. However, such a method prolongs research and development time and reduces efficiency.

Correspondingly, if a debugging engine is enabled to have a debugging function, code of the debugging engine needs to be modified. Because the script engine is usually designed by using open source code, adding the debugging function is relatively difficult and often causes incorrect running of the debugging engine. Therefore, a solution in which script debugging and quick problem locating can be implemented without modifying code of a script engine needs to be provided.

SUMMARY

Embodiments disclose a script debugging method, a device, and a computer storage medium, so that a debugger having no debugging function can implement functions of script debugging, quick problem locating, and the like without modifying code of the debugger (script engine).

According to a first aspect, an embodiment discloses and provides a script debugging method. The method includes:

obtaining, by a device, a debugging instruction, where the debugging instruction carries a to-be-debugged target line breakpoint, and the target line breakpoint includes at least line information used to indicate a line of code in which a breakpoint location is located in a script file requested to be debugged; and displaying a debugging result when determining that a breakpoint debugging condition is met, where the debugging result includes information obtained by the debugger when the device performs breakpoint processing on the line of code corresponding to the target line breakpoint, the breakpoint debugging condition includes at least that identification information corresponding to a target interface breakpoint is consistent with identification information corresponding to a target local variable, the target interface breakpoint is determined based on the target line breakpoint, and the target local variable is determined based on upper and lower lines of code that are associated with the target line breakpoint.

According to a second aspect, an embodiment discloses a script debugging method. The method includes:

receiving, by a debugger, a debugging trigger instruction, where the debugging trigger instruction carries a to-be-debugged target interface breakpoint, the target interface breakpoint is determined based on a to-be-debugged target line breakpoint, and the target line breakpoint includes at least line information used to indicate a line of code in which a breakpoint location is located in a script file requested to be debugged; and displaying a debugging result when determining that a breakpoint debugging condition is met, where the debugging result includes information obtained by the debugger when the device performs breakpoint processing on the line of code corresponding to the target line breakpoint, the breakpoint debugging condition includes at least that identification information corresponding to the target interface breakpoint is consistent with identification information corresponding to a target local variable, the target interface breakpoint is determined based on the target line breakpoint, and the target local variable is determined based on upper and lower lines of code that are associated with the target line breakpoint.

In some possible embodiments, the method further includes:

obtaining a debugging instruction, where the debugging instruction carries the to-be-debugged target line breakpoint; and sending a debugging request instruction to a container connected to the debugger, where the debugging request instruction carries the target interface breakpoint, so that the container sends the debugging trigger instruction to the debugger when the container executes the script file to a breakpoint location corresponding to the target interface breakpoint.

In some possible embodiments, when the debugging instruction is a single-step debugging instruction, the debugging instruction further carries candidate debugging information associated with the target line breakpoint. The debugging trigger instruction further carries a candidate interface breakpoint. The candidate interface breakpoint is determined based on the candidate debugging information. The candidate debugging information includes at least line information of a next to-be-executed line of code associated with the target line breakpoint in the script file.

With reference to the first aspect or the second aspect, in some possible embodiments, the target interface breakpoint is determined based on pre-stored target class information corresponding to the line of code in which the target line breakpoint is located. The target interface breakpoint is a breakpoint that can be identified by a debug interface in the device.

With reference to the first aspect or the second aspect, in some possible embodiments, the method further includes:

creating an association relationship between a plurality of pieces of key information and a plurality of pieces of class information, where the plurality of pieces of key information are associated with a plurality of line breakpoints, the plurality of line breakpoints include at least the target line breakpoint, and the plurality of pieces of class information includes at least the target class information.

With reference to the first aspect or the second aspect, in some possible embodiments, the displaying a debugging result when determining that a breakpoint debugging condition is met includes:

traversing all line breakpoints in the script file, and determining, when the target class information corresponding to the target line breakpoint is found, the identification information of the target local variable corresponding to the target line breakpoint; and displaying the debugging result when the identification information of the target local variable is consistent with the identification information of the target interface breakpoint.

With reference to the first aspect or the second aspect, in some possible embodiments, the method further includes:

creating a mapping relationship between the plurality of pieces of key information and a plurality of local variables, where the plurality of pieces of key information are associated with the plurality of line breakpoints, the plurality of line breakpoints include at least the target line breakpoint, and the plurality of local variables include at least the target local variable corresponding to the target line breakpoint.

With reference to the first aspect or the second aspect, in some possible embodiments, the identification information includes line information and/or ID information.

With reference to the first aspect or the second aspect, in some possible embodiments, the debugging instruction includes any one of the following: a breakpoint debugging instruction, a single-step debugging instruction, and a step in instruction.

With reference to the first aspect or the second aspect, in some possible embodiments, the debugging result includes at least one of the following: focal point location information, stack calling information, and local variable information. The focal point location information is used to indicate information about a line in which the target line breakpoint is located in the script file. The stack calling information is used to indicate information about a stack that needs to be called during debugging of the script file. The stack information includes at least the line of code corresponding to the target line breakpoint. The local variable information includes at least one local variable including the target local variable. The local variable is calculated based on the line of code corresponding to the target line breakpoint and the upper and lower lines of code associated with the line of code.

With reference to the first aspect or the second aspect, in some possible embodiments, the method further includes:

resuming, when determining that the breakpoint debugging condition is not met, executing the script file starting from the line of code corresponding to the target line breakpoint.

According to a third aspect, an embodiment discloses and provides a device, including a functional unit configured to perform the method according to the first aspect.

According to a fourth aspect, an embodiment discloses and provides a debugger, including a functional unit configured to perform the method according to the second aspect.

According to a fifth aspect, an embodiment discloses and provides a script debugging system, including a debugger and a container.

The debugger is the debugger according to the fourth aspect.

The container is configured to send a debugging trigger instruction to the debugger when executing a script file to a breakpoint location corresponding to a target interface breakpoint. The debugging trigger instruction carries a to-be-debugged target interface breakpoint. The target interface breakpoint is determined based on a to-be-debugged target line breakpoint. The target line breakpoint includes at least line information used to indicate a line of code in which a breakpoint location is located in the script file requested to be debugged. Optionally, the container is configured to: receive a debugging request instruction sent by the debugger, where the debugging request instruction carries the target interface breakpoint; and store the target line breakpoint, so that the container sends the debugging trigger instruction to the debugger when the container executes the script file to the breakpoint location corresponding to the target interface breakpoint.

For content not shown or described herein, refer to the related description in the foregoing embodiments. Details are not described herein again.

According to a sixth aspect, an embodiment provides a device, including a memory, a communications interface, and a processor coupled to the memory and the communications interface. The memory is configured to store an instruction. The processor is configured to execute the instruction. The communications interface is configured to communicate with another device under control of the processor. The processor performs, when executing the instruction, the method according to the first aspect.

According to a seventh aspect, an embodiment provides a debugger, including a memory, a communications interface, and a processor coupled to the memory and the communications interface. The memory is configured to store an instruction. The processor is configured to execute the instruction. The communications interface is configured to communicate with a container under control of the processor. The processor performs, when executing the instruction, the method according to the second aspect.

According to an eighth aspect, a computer-readable storage medium is provided. The computer-readable storage medium stores program code used for email transmission. The program code includes an instruction used for performing the method according to the first aspect.

According to a ninth aspect, a computer-readable storage medium is provided. The computer-readable storage medium stores program code used for email transmission. The program code includes an instruction used for performing the method according to the second aspect.

According to a tenth aspect, a computer program product including an instruction is provided. When the computer program product is run on a computer, the computer is enabled to perform the method according to the first aspect.

According to an eleventh aspect, a computer program product including an instruction is provided. When the computer program product is run on a computer, the computer is enabled to perform the method according to the second aspect.

Through implementation of the embodiments, functions such as script debugging and quick problem locating can be implemented without modifying a script engine to have a debugging function.

BRIEF DESCRIPTION OF DRAWINGS

To describe the technical solutions in the embodiments or in the prior art more clearly, the following briefly describes the accompanying drawings required for describing the embodiments or the prior art.

DESCRIPTION OF EMBODIMENTS

Figure 1:
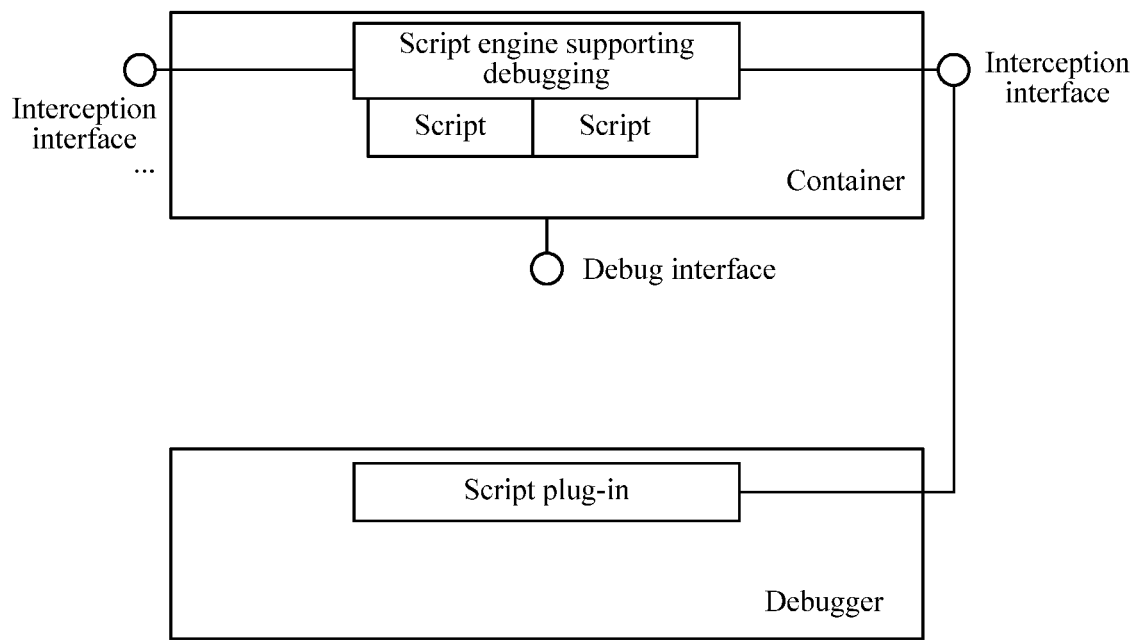
FIG. 1 is a schematic diagram of a network framework provided in the prior art.

The following describes the technical solutions in the embodiments in detail with reference to the accompanying drawings.

A script is usually interpreted and executed by using a corresponding script engine; that is, a script file is compiled and executed by using a script engine. There are a plurality of types of script languages, and there are a plurality of types of corresponding script engines. Different scripts (files) need to be complied by different script engines. That is, one type of script (file/language) corresponds to one type of script engine.

A script engine is an interpreter for a computer programming language, and a function of the script engine is interpreting and executing a program file of a user, and compiling the program file into machine code that can be identified and executed by a computer, to complete a corresponding function. Currently, commonly used script engines are usually classified into the following three types.

A script engine of the first type directly compiles a script into a class file. The script may be debugged by directly calling a related debug interface, for example, a java debug interface (JDI), instead of using a separate script engine. The script engine, such as a groovy, scala, kotlin, Fantom, Jython, or Jruby script engine, herein has functions such as script language description, execution, and debugging. Because the type of script does not need to be compiled and debugged by using a script engine, the type of script does not fall within the discussion scope of the present invention.

A script engine of the second type is a script engine having a debugging function. The script engine supports functions of setting actions such as breakpoint and single-step execution during script execution, for example, a python, perl, PHP, ruby, LUA, ANT, or xslt script engine. When a script is executed by using the script engine having a debugging function, a to-be-debugged script file (namely, code) needs to be put into the debugging engine to be executed together with the script. In this case, the technology may be referred to as an intrusive debugging technology.

A script engine of the third type is a script engine having no debugging function, for example a freemarker, BPMN, smooks, gradle, or shell script engine. Because the script engine has no debugging function, the script engine cannot be used to debug and compile a script file, and cannot locate a problem that occurs in a script.

When a script is compiled and debugged by using a script engine, some debug interfaces need to be used. Using the java language an example, some debug interfaces, such as a JDI interface, that need to be used by the script engine are defined in the highest layer in a three-layer model of the java debug wire protocol (JPDA). Based on the debug interfaces, a debugger may learn of a status of a virtual machine in time, for example, classes and container instances on the virtual machine. In addition, the debugger can further control running of the virtual machine, for example, operations such as suspending/resuming a thread on the virtual machine and setting a breakpoint.

A script debugging solution provided in the prior art is as follows. An interception interface needs to be enabled when a script engine is started, and the interception interface is used to intercept a debugging request command that needs to be executed. A debugger (which may be a script plug-in in the debugger) is connected to the script engine by using the interception interface, to compile and debug a script. For details, refer to a schematic diagram of a framework provided in the prior art that is shown in FIG. 1.

It is found through research that when a debugging function of a script engine is called, a corresponding interception interface needs to be started. The interception interface and a debug interface (for example, a JDI interface) are independent of each other. Each type of interception interface can debug only one type of script. If a plurality of types of scripts need to be debugged at the same time, a same debugger needs to be connected to a plurality of interception interfaces of the script engine, to compile and debug the scripts. Different interception interfaces cannot be mutually called. In this way, a plurality of interception interfaces are designed in a same script engine, and the plurality of interception interfaces are incompatible and independent, increasing design difficulty and manpower costs. In addition, some script engines having a debugging function cannot debug a script, and cannot locate a problem. If a script engine is intended to have a debugging function, code of the script engine needs to be modified. Code of a target script engine is of an open source design. Therefore, modification is difficult, and adding a debugging function easily causes a problem during running of the script engine.

Figure 2:
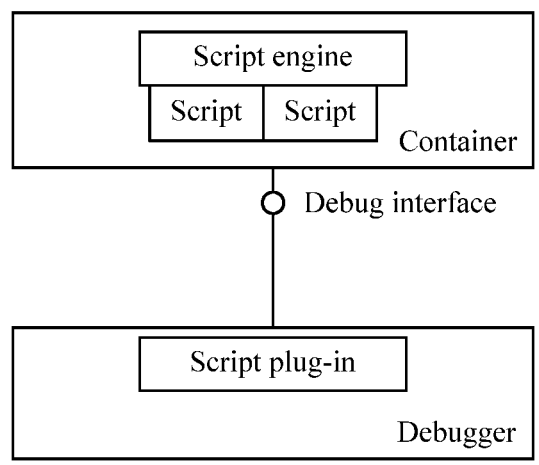
FIG. 2 is a schematic diagram of a network framework according to an embodiment.

To resolve the foregoing problem, embodiments provide a solution in which functions such as script debugging and quick problem locating are implemented without modifying a script engine to have a debugging function. The following describes a schematic diagram of a network framework to which the embodiments are applicable. For example, as shown in FIG. 2, the schematic diagram of the network framework includes a container and a debugger. A quantity of containers and a quantity of debuggers are not limited in the figure. The figure shows only one container and one debugger.

The container may be deployed/run on a virtual machine. A script engine configured to compile and debug a script is designed in the container. A java container is used as an example, and may refer to a java process of running a script engine. When the java container is started, a debugging feature (namely, a debugging function) of a java virtual machine (JVM) may be enabled by using a related parameter of a vulnerability tool (Xdebug). The script engine in the java container may refer to a jar packet having a script parsing and execution capability, and is usually developed by using the java language.

The debugger (which is a plug-in in the debugger) may communicate with, and be connected to, a script engine whose debugging function is enabled, and is configured to debug a front end process of a script (code). A debugger such as Eclipse, Intellij IDEA, or NetBeans is commonly used.

In an optional embodiment, an interface used for communication between the container and the debugger is a debug interface, for example, a JDI interface. During debugging of the script, a debugging instruction that can be used includes, but is not limited to, any one or a combination of a plurality of the following action instructions: start, pause, reply, step into, step over, step out, set a breakpoint, trigger a breakpoint, trigger an exception, modify a variable, and read a stack. Optionally, a debugging instruction is closely related to a script language. Using the java language as an example, the breakpoint setting instruction may be bp:build-.xml:10.

Figure 3:
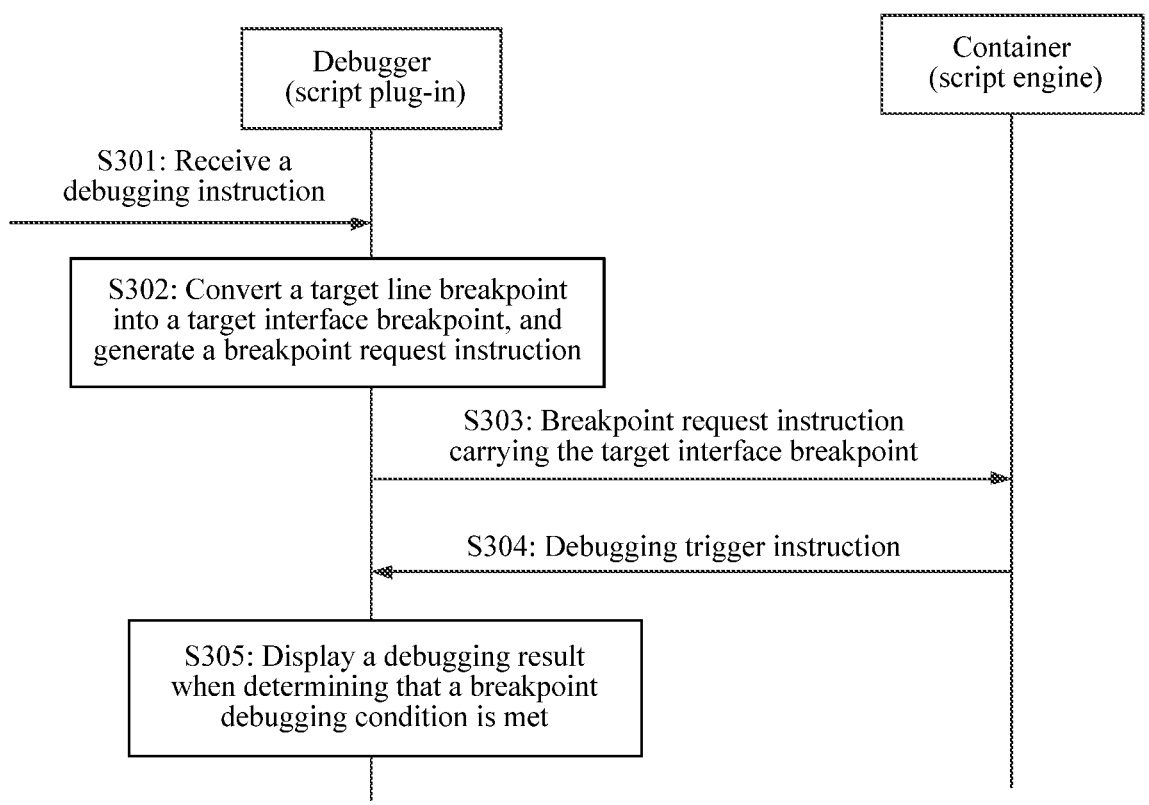
FIG. 3 is a schematic flowchart of a script debugging method according to an embodiment.

Based on the schematic diagram of the network framework shown in FIG. 2, FIG. 3 is a schematic flowchart of a script debugging method according to an embodiment. The method shown in FIG. 3 may include the following implementation steps.

Step S301: The debugger receives a debugging instruction, where the debugging instruction carries a to-be-debugged target line breakpoint, and the target line breakpoint is used to indicate a breakpoint location in a line in which a line of code is located in a script file requested to be debugged is located.

The debugging instruction may be sent by a client (user). The debugging instruction carries at least related information of the target line breakpoint. The target line breakpoint is a breakpoint set by the user in the script file. The related information includes, but is not limited to, information about a location of the line of code corresponding to the line breakpoint in the script file (namely, the breakpoint location, for example, the line in which the breakpoint is located in the script file), a quantity of specified line breakpoints, a script file or an identifier of a script file that corresponds to a specified breakpoint, other information related to the line breakpoint, or the like. Optionally, the line breakpoint may also be referred to as a script breakpoint, namely, a breakpoint set by the user to debug a script file on a user layer side.

Step S302: The debugger converts the target line breakpoint into a target interface breakpoint, and generates a corresponding breakpoint request instruction, where the breakpoint request instruction carries the target interface breakpoint, and the target interface breakpoint is a breakpoint that can be identified by a debug interface.

Step S303: The debugger sends the breakpoint request instruction to the container. Correspondingly, the container receives the breakpoint request instruction.

Step S304: When the container executes the script file to a breakpoint location corresponding to the target interface breakpoint, the container sends a debugging trigger instruction to the debugger, where the debugging trigger instruction carries the target interface breakpoint. Correspondingly, the debugger receives the debugging trigger instruction.

Step S305: The debugger displays a debugging result when determining that a breakpoint debugging condition is met, where the debugging result is information obtained by the debugger when the debugger executes upper and lower lines of code that are associated with the target line breakpoint, the breakpoint debugging condition includes that identification information of the target interface breakpoint is consistent with identification information of a target local variable, and the target local variable is determined based on the upper and lower lines of code that are associated with the target line breakpoint.

In this application, the container and the debugger may be deployed in a same device, or may be deployed in different devices.

The following describes some specific embodiments and optional embodiments in this application.

Before step S301, the debugger first needs to be started. The debugger may start and load a related script plug-in. The script plug-in may be an internal plug-in of the debugger (as shown in FIG. 2), or may be a plug-in having a script debugging function in another device. This is not limited. When the script plug-in is the internal plug-in of the debugger. The debugger may automatically search a plug-in target for a related script plug-in and load the script plug-in. After the script plug-in is loaded, further, the script plug-in may register related debugging commands in the debugger, so that the debugger has a function of executing the debugging commands, and intercepts a debugging port, to debug a script. For the debugging commands, refer to the related description in the foregoing embodiments. Details are not described herein again.

Correspondingly, research and development personnel may open the script file in the debugger to execute a corresponding debugging action (for example, a breakpoint setting action). That is, the client may send a script debugging request to the debugger. The script debugging request is used to enable a debugging function of the debugger, for subsequently debugging the script file.

In step S301, the debugging instruction carries at least related information of the breakpoint set by the user in the script file (namely, the target line breakpoint in this application). The related information includes, but is not limited to, a breakpoint location (for example, a line in which the specified breakpoint is located in the script file) or the like. For details, refer to the related description in the foregoing embodiments. Details are not described herein again. For the debugging instruction, refer to the related description of the debugging commands. Details are not described herein again.

It may be understood that each line of code in the script file has key information corresponding to the line of code. The key information includes, but is not limited to, a keyword and a key phrase. One or more lines of code may correspond to one or more pieces of key information. The key information, for example, ServiceTaskBeginNode and ServiceTaskEndNode, is used to identify a function of the line of code (that is, an operation that the line of code is used to perform).

In step S302, the debugger may convert the target line breakpoint into the target interface breakpoint that the debug interface can identify. For example, the debug interface of the container can identify, based on the target interface breakpoint, the breakpoint location (for example, the line in which the breakpoint is located in the script file) that is of the breakpoint (namely, the line breakpoint) set in the script file and that corresponds to the target interface breakpoint. Further, the debugger may generate a corresponding breakpoint request instruction, and send the breakpoint request instruction to the container (which refers to the script engine in the container), so that the container (namely, the script engine) executes the breakpoint request instruction.

Optionally, the debugger further needs to pre-establish a communication connection to the container, so that the debugger sends the generated breakpoint request instruction to the container.

The following describes an implementation related to step S302.

In step S302, the debugger may determine the target interface breakpoint based on pre-stored target class information corresponding to the target line breakpoint, and further generate the corresponding breakpoint request instruction.

Correspondingly, before step S302, the method may further include: The debugger creates an association relationship between a plurality of line breakpoints and a plurality of pieces of class information. Optionally, the line breakpoint is associated with the key information. For example, one or more lines of code (line breakpoint) may correspond to one or more pieces of key information. Further, the debugger may also create an association relationship between a plurality of pieces of key information and a plurality of pieces of class information, the plurality of line breakpoints include at least the target line breakpoint or the plurality of pieces of key information include at least target key information associated with the target line breakpoint, and the plurality of pieces of class information include at least the target class information.

It may be understood that the key information is a keyword used as an example. Table 1 below shows mapping between script keywords and class information in a script file; that is, it shows an association relationship between a script keyword and a class name

TABLE 1

| Keyword | Class name | Class line |
|---|---|---|
| ServiceTaskBeginNode | AbstractTaskClassName | 42 |
| ServiceTaskEndNode | AbstractTaskClassName | 67 |
| SequenceFlowBeginNode | BpmnActivityBehaviorClassName | 129 |
| SequenceFlowEndNode | BpmnActivityBehaviorClassName | 129 |
| StartEventBeginNode | ExecutionEntityClassName | 381 |
| StartEventEndNode | ExecutionEntityClassName | 381 |
| EndEventBeginNode | ExecutionEntityClassName | 399 |
| EndEventEndNode | ExecutionEntityClassName | 399 |

Table 1 above shows an association relationship between a keyword and class information (including a class name and a line in which a class is located in the script file). Referring to Table 1 above, an implementation of step S302 is: the debugger may determine, based on the line in which the target line breakpoint is located in the script file (namely, the line in which the breakpoint location is located), target key information (namely, a keyword herein) that is in the line or upper and lower lines of code that are associated with the line and that is used to identify the breakpoint location; and then find target class information (which may be a line in which a target class is located) corresponding to the target key information from a pre-stored association relationship (for example, Table 1 that shows the table of the mapping between a keyword and class information) between at least one piece of key information and at least one piece of class information. Further, the debugger may convert the target line breakpoint into the target interface breakpoint. For example, the target interface breakpoint is used to: indicate the target class information (which may refer to the line in which the target class corresponding to the breakpoint location is located), and generate a corresponding debugging request instruction, for example, a JDI debugging request instruction. The debugging request instruction carries the target interface breakpoint, which refers to indication information of the target interface breakpoint, for example, the target class information (a class name and a line in which a class is located) corresponding to the target interface breakpoint.

In step S303, the container receives the breakpoint request instruction. Optionally, the container may further record the target interface breakpoint carried in the breakpoint request instruction.

In step S304, if the container executes the script file to the breakpoint location corresponding to the target interface breakpoint, the container may send the debugging trigger instruction to the debugger, and the debugging trigger instruction carries the target interface breakpoint (which may be the indication information of the target interface breakpoint).

In step S305, after the debugger receives the debugging trigger instruction, the debugger may traverse all specified line breakpoints in the script file, and determine whether a target line breakpoint meeting the breakpoint debugging condition exists, and if the target line breakpoint meeting the breakpoint debugging condition exists, the debugger continues to perform subsequent breakpoint processing, and display the debugging result.

The following describes an implementation of step S305.

In step S305, when the debugger receives the debugging request instruction, the debugger may traverse all line breakpoints in the script file. Based on an association relationship that is between each line breakpoint (or key information corresponding to each line breakpoint) and each piece of class information and that is pre-stored in the debugger, for example, the mapping relationship between a keyword and class information shown in Table 1 above, the debugger may determine the class information corresponding to each line breakpoint; and then determine whether the class information corresponding to each line breakpoint includes the target class information (namely, the target class information corresponding to the target interface breakpoint) carried in the debugging trigger instruction, that is, the debugger determines whether the target interface breakpoint matches the target line breakpoint, and if the class information corresponding to each line breakpoint includes the target class information carried in the debugging trigger instruction/the target interface breakpoint matches the target line breakpoint, the debugger continues to perform a subsequent procedure; otherwise, the debugger ends the procedure.

When the target interface breakpoint matches the target line breakpoint, the debugger may call related stack information to calculate some local variables in upper and lower lines of code that are related to the target line breakpoint. It may be understood that a line of code corresponding to the target line breakpoint and upper and lower lines of code that are associated with the line of code may include a plurality of local variables. The local variables may be provided for the research and development personnel to check and determine whether an error occurs in a related line of code, to locate a problem in the script file (namely, code). To accurately debug the script file, the local variables include one target local variable, so that the debugger can perform a subsequent breakpoint processing operation and display the debugging result only when further determining that identification information of the target local variable is consistent with the identification information of the target interface breakpoint (which may also be the target class information corresponding to the target interface breakpoint, namely, the line in which the target class is located in the script file). The identification information includes, but is not limited to, line information, ID information, and the like. For example, the identification information of the target local variable may be a line in which a line of code including the target local variable is located in the script file, or an ID field used to identify the target local variable, or the like. Correspondingly, the identification information of the target interface breakpoint is similar to the identification information of the target local variable. Details are not described herein again.

The target local variable is determined based on the target line breakpoint. For example, the debugger may pre-store an association relationship between a plurality of line breakpoints and a plurality of pieces of local variable information. Optionally, the debugger may alternatively pre-store information about an association between key information respectively corresponding to a plurality of line breakpoints and a plurality of pieces of local variable information. The plurality of line breakpoints include at least the target line breakpoint, or the plurality of pieces of key information include at least the target key information corresponding to the target line breakpoint. The plurality of pieces of local variable information include at least information about the target local variable.

That the key information is a keyword is used as an example. Table 2 below shows mapping between keywords and local variable information.

pre-stored association relationship (for example, Table 2 above that shows the mapping between keywords and local variable information) between at least one piece of key information and at least one piece of local variable information. Further, the debugger may find a target local variable (namely, the identification information of the target local variable in this application) corresponding to the target local variable name from the plurality of local variables calculated based on the line of code corresponding to the target line breakpoint and the upper and lower lines of code. Then the debugger determines whether the identification information of the target local variable is the same as the identification information of the target interface breakpoint (which may be the target class information in this application). If the identification information of the target local variable is the same as the identification information of the target interface breakpoint, the debugger performs breakpoint processing, and displays the debugging result.

The debugging result includes, but is not limited to, focal point location information, stack calling information, local variable information, and the like. The focal point location information is used to indicate the line of code corresponding to the breakpoint location at which the target line breakpoint is located in the script file. The stack calling information is stack information that needs to be called during calculation of a local variable. A topmost-layer stack may be the line of code corresponding to the target line breakpoint in the script file. The local variable information refers to one or more local variables calculated by using the line of code corresponding to the target line breakpoint and upper and lower lines of code.

In contrast, when the target interface breakpoint does not match the target line breakpoint, the debugger may send an execution resuming instruction to the container. Correspondingly, the container receives the execution resuming instruction, and the container continues, as indicated by the execu-

TABLE 2

| Keyword | Local variable name | Stack number |
| --- | --- | --- |
| ServiceTaskBeginNode | ((ActivityImpl)((ExecutionEntity)execution).activity).id | 0 |
| ServiceTaskEndNode | ((ActivityImpl)((ExecutionEntity)execution).activity).id | 0 |
| SequenceFlowBeginNode | ((TransitionImpl)outgoingTransition).id | 1 |
| SequenceFlowEndNode | ((TransitionImpl)outgoingTransition).id | 1 |
| StartEventBeginNode | ((ProcessDefinitionEntity)((ExecutionEntity)this).processDefinition).key | 0 |
| StartEventEndNode | ((ProcessDefinitionEntity)((ExecutionEntity)this).processDefinition).key | 0 |
| EndEventBeginNode | ((ProcessDefinitionEntity)((ExecutionEntity)this).processDefinition).key | 0 |
| EndEventEndNode | ((ProcessDefinitionEntity)((ExecutionEntity)this).processDefinition).key | 0 |

It may be learned from Table 2 above that the shown local variable information may include local variable names and stacks (namely, the stack numbers in Table 2) in which the local variables are located. Referring to Table 2 that shows the table of the mapping between keywords and local variable information, in step S305, when the debugger determines that the target interface breakpoint matches the target line breakpoint, the debugger may determine, based on the line in which the target line breakpoint is located in the script file (namely, the line in which the breakpoint location is located), target key information (namely, a keyword herein) that is in the line or upper and lower lines of code that are associated with the line and that is used to identify the breakpoint location; and then find target local variable information (which may be a target local variable name) corresponding to the target key information from a tion resuming instruction, to execute the script file from the breakpoint location corresponding to the target interface breakpoint.

Through implementation of the embodiments, a script can be debugged by using a script engine having no debugging function, improving developing efficiency, and shortening time to marketing (TTM).

Figure 4:
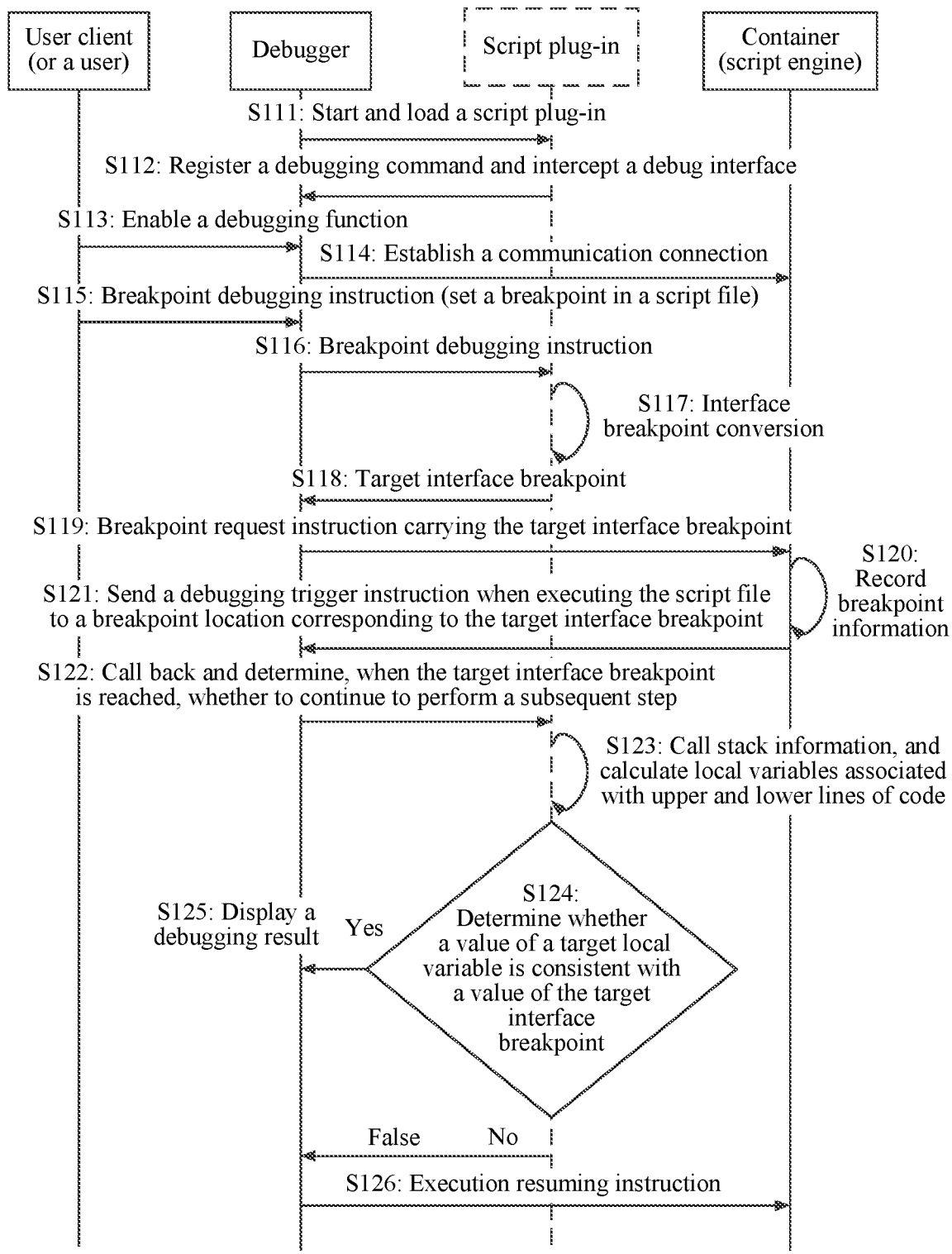
FIG. 4 is a schematic flowchart of another script debugging method according to an embodiment.
Figure 5:
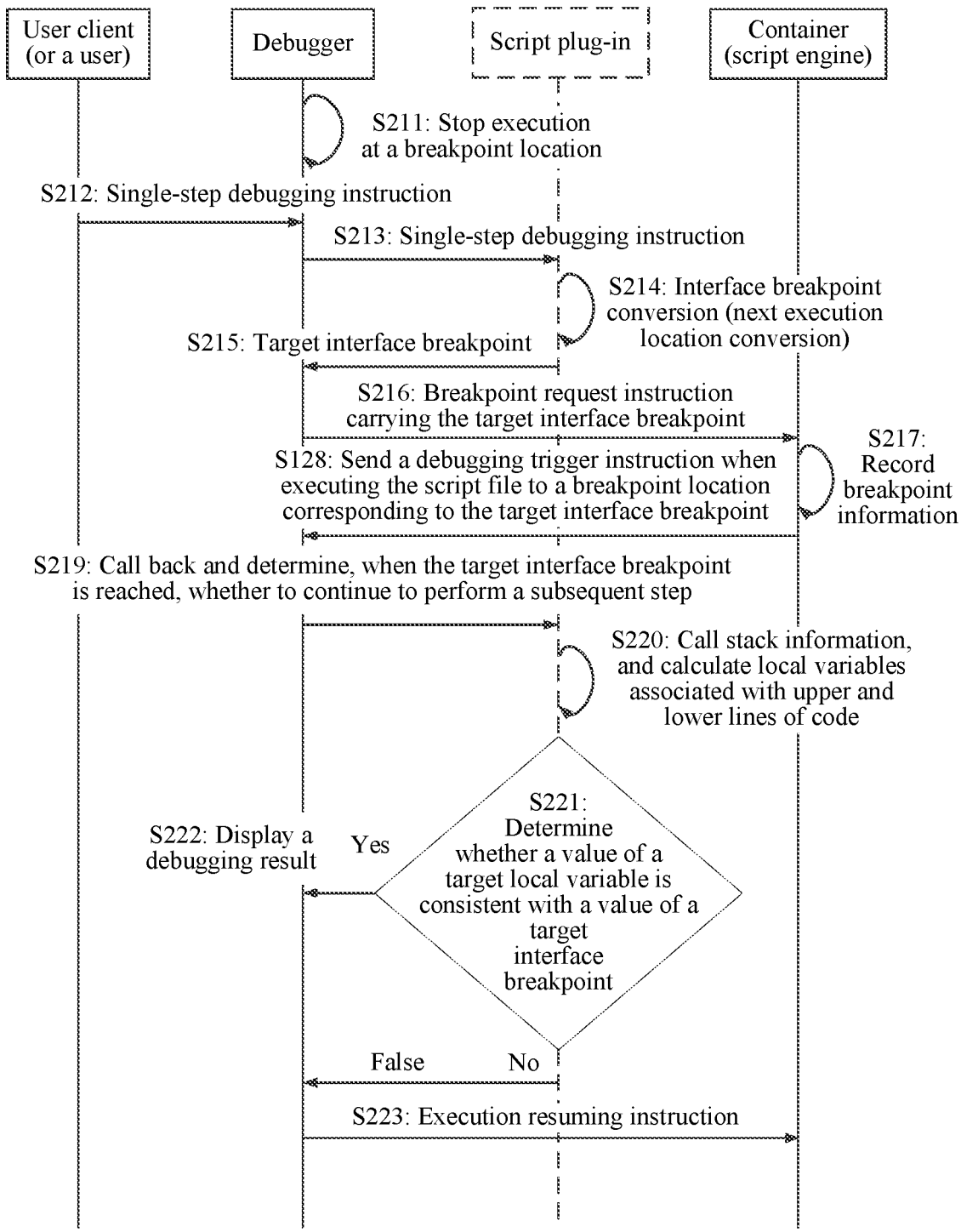
FIG. 5 is a schematic flowchart of another script debugging method according to an embodiment.

An example in which the debugging instruction is a breakpoint debugging instruction and an example in which the debugging instruction is a single-step debugging instruction are used below. FIG. 4 and FIG. 5 respectively show some embodiments related to the breakpoint debugging instruction and the single-step debugging instruction.

A situation where the debugging instruction is the breakpoint debugging instruction is used as an example. FIG. 4 is a schematic flowchart of a script debugging method. The script debugging method shown in FIG. 4 may include the following implementation steps.

S111 and S112: Start a debugger and load a script plug-in, to register a related debugging instruction in the debugger and intercept a debug interface (for example, a JDI interface in java development).

S113 and S114: A user client needs to establish a communication connection, such as a socket connection, between the debugger and a container (for example, a java container) when enabling a debugging function of the debugger, that is, performing an operation of enabling the debugging function in the debugger, to subsequently notify the container of a related breakpoint debugging instruction.

S115 to S120: The user client sends the breakpoint debugging instruction to the debugger, where the breakpoint debugging instruction carries a target line breakpoint; and the debugger converts the target line breakpoint into a target interface breakpoint, and sends a debugging request instruction to the container, where the debugging request instruction carries the target interface breakpoint.

In an embodiment, a developer opens a script file in the debugger, and sets a corresponding target line breakpoint; that is, performs a breakpoint setting operation. The target line breakpoint is used to indicate a breakpoint location of the specified breakpoint in a line of code in the script file. When receiving the breakpoint setting operation, the script plug-in may determine, based on a pre-stored mapping relationship between a plurality of pieces of key information (or a plurality of line breakpoints) and a plurality of pieces of class information, for example, Table 1 above shows the table of the mapping between script keywords and class information that can be identified by the script engine, target class information (which may be line information of a target class in which the target line breakpoint is located in the script file) corresponding to the target line breakpoint (or target key information associated with the target line breakpoint). Further, the target line breakpoint may be converted into a target interface breakpoint (for example, a JDI breakpoint), to generate a corresponding JDI debugging request instruction, and send the JDI debugging request instruction to the container. Correspondingly, the container receives the debugging request instruction and records the debugging request instruction. For example, the container may record the target interface breakpoint carried in the debugging request instruction, that is, record related breakpoint information.

S121: The container (which may be a script engine) sends a debugging trigger instruction (namely, a breakpoint trigger event) to the debugger when the container executes the script file to a breakpoint location corresponding to the target interface breakpoint.

S122 to S124: The debugger receives the debugging trigger instruction, and determines, when the target interface breakpoint is reached, whether to continue to perform a subsequent step. If yes, the debugger may call stack information to calculate at least one local variable corresponding to upper and lower lines of code that are associated with the target line breakpoint. Further, the debugger obtains a target local variable associated with the target line breakpoint, and determines whether identification information of the target local variable is consistent with identification information of the target line breakpoint. If the identification information of the target local variable is consistent with the identification information of the target line breakpoint, the debugger performs step S125 of displaying a debugging result; otherwise, the debugger performs step S126.

For example, when the debugger receives the debugging trigger instruction (or receives the breakpoint trigger event), the debugger may traverse all line breakpoints set in the script file, and may determine class information corresponding to each line breakpoint, based on the association relationship between the plurality of pieces of key information and the plurality of pieces of class information that is pre-stored in Table 1 above. In addition, when the debugger obtains class information corresponding to a line breakpoint, the debugger checks whether the class information matches the target class information indicated by the target interface breakpoint carried in the debugging trigger instruction, and if the class information matches the target class information, the debugger determines that the subsequent step, for example, step S123, can continue to be performed when the target interface breakpoint is reached. If the class information does not match the target class information, the debugger may traverse other line breakpoints in the script file or end the procedure.

Correspondingly, after determining that the subsequent step can continue to be executed when the target interface breakpoint is reached, the debugger (which may be a script plug-in) may call related stack information, and calculate one or more local variables corresponding to a line of code in which the target interface breakpoint is correspondingly located and upper and lower lines of code that are associated with the line of code. The local variable includes identification information of the local variable, for example, a line in which the local variable is located in the script file, or an ID field used to identify the local variable.

Further, the script plug-in may obtain a target local variable associated with the target interface breakpoint, determine whether identification information of the target local variable is consistent with the identification information of the target line breakpoint (which may be the target class information indicated by the target interface breakpoint), and if the identification information of the target local variable is consistent with the identification information of the target line breakpoint, perform the subsequent step S125; otherwise, end the procedure.

The target local variable may be target local variable information that corresponds to target key information corresponding to the target interface breakpoint and that is found by the script plug-in based on the pre-stored association relationship between the plurality of pieces of key information and the plurality of pieces of local variable information (for example, the association relationship between script keywords and local variables that is shown in Table 2 above). By citing Table 2 above, a target local variable name may be learned of. Then the script plug-in obtains the identification information of the target local variable from the plurality of local variables based on the target local variable name. If the identification information of the target local variable is consistent with the identification information of the target interface breakpoint, it may further be understood that a value of the target local variable is consistent with a value corresponding to the target interface breakpoint, so that it may be considered that the container (which may be a script engine) is executing the breakpoint debugging instruction, or, in other words, is executing the breakpoint debugging instruction to the line of code in which the breakpoint location is located. If the identification information of the target local variable is inconsistent with the identification information of the target interface breakpoint, it may be considered that the container executes no breakpoint debugging instruction, i.e., the container does not execute the script file to the line of code in which the breakpoint location is located, so that S216 of sending an execution resuming instruction to the container may continue to be performed, and the container is enabled to continue to execute the script file from the line of code in which the breakpoint location corresponding to the target line breakpoint is located.

S125: Display the debugging result. In this embodiment, the debugger may display the script file in an editing window, and display a focal point at the line of code in which the breakpoint location corresponding to the target line breakpoint is located. Optionally, the debugger may further display stack calling information in a stack window. The stack calling information refers to a stack used during calculation of the local variable information. A topmost stack may be displayed as a script line, for example, the line of code corresponding to the target line breakpoint in the script file. Optionally, the debugger may further display the plurality of local variables generated by executing the upper and lower lines of code in a local variable window, and may display identification information of each local variable (for example, a line in which the local variable is located, an ID field, or a value).

S126: Send the execution resuming instruction to the container. If the debugger determines that the results are inconsistent, the debugger may send the execution resuming instruction to the container, so that the container continues to execute the script file from the line of code in which the breakpoint location corresponding to the target line breakpoint is located.

FIG. 5 shows a script debugging method related to a single-step debugging instruction. The method shown in FIG. 5 may include the following implementation steps.

S211: A debugger stops executing a script file when the debugger executes the script file to a line of code in which a breakpoint location corresponding to a target line breakpoint is located. That is, the debugger stops executing the script file from the line of code in which the breakpoint location is located. Subsequently, the debugger may debug the script file by using a single-step (for example, step into, step over step Over, and step out) debugging function.

S212 and S213: When the debugger stops executing the script file at the line of code in which the target line breakpoint (breakpoint location) is located in the script file, a user client (which may alternatively be a developer) executes the single-step debugging instruction in the debugger. That is, the debugger receives single-step debugging instruction, where the single-step debugging instruction carries the target line breakpoint (namely, line information corresponding to the line of code in which the breakpoint location is located in the script file). The debugger may forward the single-step debugging instruction to a script plug-in, so that the script plug-in performs a breakpoint conversion operation.

S214 to S217: The script plug-in may convert the target line breakpoint into a target interface breakpoint. Optionally, the script plug-in may further convert all upper and lower lines of code that are associated with the target line breakpoint into an interface breakpoint. The script plug-in generates a corresponding single-step debugging request instruction, and the single-step debugging request instruction carries the target interface breakpoint.

For example, one or more lines of code include at least one piece of key information. The key information includes, but is not limited to, a keyword. The essence of converting the target line breakpoint into the target interface breakpoint is: determining, based on target key information associated with the target line breakpoint, information about a target class in which the target line breakpoint is located (namely, target class information, for example, a line in which the target class is located), namely, an interface breakpoint that can be identified by the script engine (container) in this application, namely, the line in which the target class is located in the script file.

An implementation of step S214 may be: the script plug-in may find, based on a pre-stored association relationship between a plurality of pieces of key information and a plurality of pieces of single-step key information, target single-step key information corresponding to key information associated with the target line breakpoint. The target single-step key information includes the key information associated with the target line breakpoint and next one or more pieces of target key information (for example, a next keyword) of single-step execution of the line of code in which the target line breakpoint is located. Then, as shown in Table 1 above, the script plug-in finds, based on the pre-stored the plurality of pieces of key information and the plurality of pieces of class information, target class information corresponding to each piece of target key information, and converts the target class information into a corresponding interface breakpoint.

That the key information is a keyword is used as an example. Table 3 below shows mapping between script keywords and next keywords.

TABLE 3

| Keyword | Single-step execution keyword |
| --- | --- |
| ServiceTaskBeginNode | ServiceTaskEndNode |
| ServiceTaskEndNode | SequenceFlowBeginNode-> ServiceTaskBeginNode |
| SequenceFlowBeginNode | ServiceTaskBeginNode |
| SequenceFlowEndNode | ServiceTaskBeginNode |
| StartEventBeginNode | SequenceFlowBeginNode-> ServiceTaskBeginNode |
| StartEventEndNode | SequenceFlowBeginNode-> ServiceTaskBeginNode |
| EndEventBeginNode | |
| EndEventEndNode | |

It may be learned from Table 3 above that the script plug-in may find, based on a keyword of the line of code in which the target line breakpoint is located, a next keyword associated with the target line breakpoint. For example, the keyword is ServiceTaskBeginNode, a next keyword corresponding to the keyword is ServiceTaskEndNode. Correspondingly, the script plug-in may determine, by using the mapping relationship that is between script keywords and class information and that is shown in Table 1 above, class information corresponding to each keyword, then convert the class information into an interface breakpoint that can be identified by the container (script engine), and further generate a corresponding debugging request instruction. For details, refer to the related description in the foregoing embodiments. Details are not described herein again.

S218: The container (which may be a script engine) sends a debugging trigger instruction (namely, a breakpoint trigger event) to the debugger when the container executes the script file to the breakpoint location corresponding to the target interface breakpoint.

S219 to S221: The debugger receives the debugging trigger instruction, and determines, when the target interface breakpoint is reached, whether to continue a subsequent step. If yes, stack information may be called to calculate at least one local variable corresponding to upper and lower lines of code that are associated with the target line breakpoint. Further, the debugger obtains a target local variable associated with the target line breakpoint, and determines whether identification information of the target local variable is consistent with identification information of the target line breakpoint. If the identification information of the target local variable is consistent with the identification information of the target line breakpoint, the debugger performs step S222 of displaying a debugging result; otherwise, the debugger performs step S223.

S222: Display the debugging result.

S223: Send an execution resuming instruction to the container, so that the container continues to execute the script file from the line of code in which the target line breakpoint is located.

For content not described or shown in this application, refer to the related description in the embodiments of FIG. 1 to FIG. 4. For example, for step S212 to step S223 in this application, refer to the related description in step S115 to step S126 in the embodiment of FIG. 4. Details are not described herein again.

It may be noted that a program compilation language scenario used in this application is not limited, for example, a java platform whose debug interface may be a JDI interface may be utilized. For another example, a development platform of an assembly language such as C++ may be used. A difference lies in that class information corresponding to an interface breakpoint and a line in which a line of code is located may need to be changed to a function name, an offset, and the like that are derived from an assembly language.

According to the embodiments, only a debug interface of a script engine needs to be called. This avoids a situation where a plurality of interception ports need to be enabled as known in the prior art, and a script file in any language type may be debugged by using the debug interface. In addition, all related debugging information of the script file is executed inside a script plug-in, so that a script file in any type of language can be debugged without support of the script engine. Such a debugging method is also referred to as non-intrusive script language debugging. A script engine having no debugging capability is enabled to quickly implement the debugging capability, improving developing efficiency, and shortening TTM.

The foregoing describes solutions provided in the embodiments from the perspective of interaction between the debugger and the container. It may be understood that, to implement the foregoing functions, a network device includes a corresponding hardware structure and/or a software module that executes each function. With reference to the units and algorithm steps of examples described in the embodiments, the embodiments can be implemented in a form of hardware or hardware and computer software. Whether a function is performed by hardware or hardware driven by computer software depends on particular applications and design constraints of the technical solutions. A person of ordinary skill in the art may use different methods to implement the described functions for each particular application, but it should not be considered that the implementation falls beyond the scope of the technical solutions in the embodiments.

In the embodiments, functional units of the network device may be divided according to the foregoing method example. For example, functional units may be divided corresponding to the functions, or two or more functions may be integrated into one processing unit. The integrated unit may be implemented in a form of hardware, or may be implemented in a form of a software functional unit. It may be noted that, in the embodiments, unit division is exemplary, and is merely a logical function division. During actual implementation, another division manner may be used, as desired.

Figure 6A:
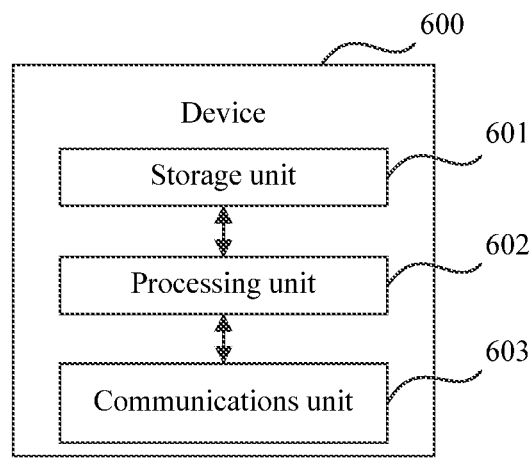
FIG. 6A is a schematic structural diagram of a network device according to an embodiment.

When an integrated unit is used, FIG. 6A is a possible schematic structural diagram of the device in the foregoing embodiments. A device 600 includes a processing unit 602 and a communications unit 603. The processing unit 602 is configured to control and manage an action of the device 600. For example, in a possible embodiment, when the device includes a debugger and a container, the processing unit 602 is configured to support the device 600 in performing S301 to S305 in FIG. 3, S111 to S124 in FIG. 4, and S211 to S221 in FIG. 5, and/or is configured to perform other steps of the technology described in the embodiments. The communications unit 603 is configured to support the device 600 in communicating with another device. For example, the communications unit 603 is configured to support the device 600 in communicating with a user client to receive a debugging instruction.

In another possible embodiment, when the device is a debugger, the processing unit 602 is configured to support the device 600 in performing S302 and S305 in FIGS. 3, S111 and S112, S116 to S118, and S122 to S124 in FIG. 4, and S211 to S221 in FIG. 5, and/or is configured to perform other steps of the technology described in the embodiments. The communications unit 603 is configured to support the device 600 in communicating with another device (for example, a container). For example, the communications unit 603 is configured to support the device 600 in performing S303 in FIG. 3, S119, S121, and S126 in FIG. 4, and S216, S218, and S223 in FIG. 5, and/or is configured to perform other steps of the technology described in the embodiments. The device 600 may further include a storage unit 601, configured to store program code and data of the device 600.

The processing unit 602 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor or the controller may implement or execute various example logical blocks, modules, and circuits described with reference to content disclosed in the present invention. Alternatively, the processor may be a combination of processors implementing a computing function, for example, a microprocessor or a combination of a plurality of microprocessors, or a combination of a DSP and a microprocessor. The communications unit 603 may be a communications interface, a transceiver, a transceiver circuit, or the like. The communications interface is a collective term, and may include one or more interfaces, for example, an interface between the device and another device (a client or another device in which a container is run). A storage unit 601 may be a memory.

Figure 6B:
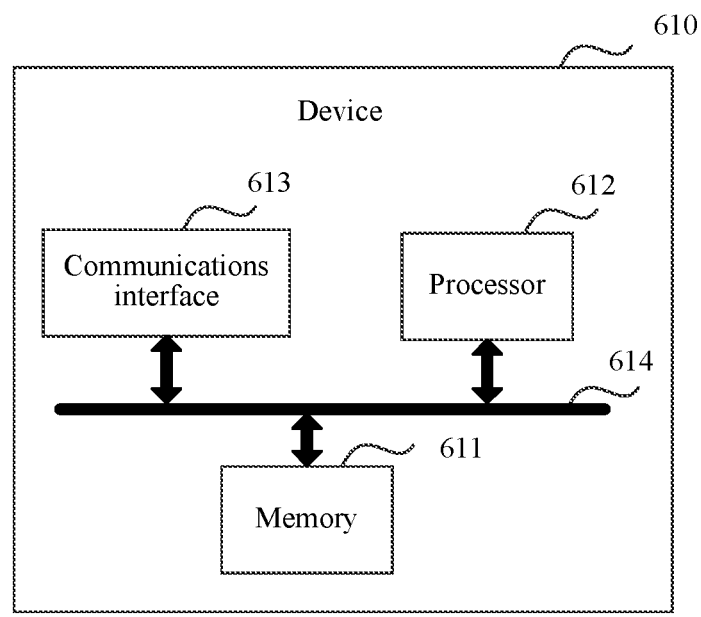
FIG. 6B is a schematic structural diagram of another network device according to an embodiment.

When the processing unit 602 is a processor, the communications unit 603 is a communications interface, and the storage unit 601 is a memory, the device in this embodiment of the present invention may be a device shown in FIG. 6B.

Referring to FIG. 6B, the network device 610 includes a processor 612, a communications interface 613, and a memory 611. Optionally, the device 610 may further include a bus 614. The communications interface 613, the processor 612, and the memory 611 may be connected to each other by using the bus 614. The bus 614 may be a peripheral component interconnect (PCI) bus, an extended industry standard architecture (EISA) bus, or the like. The bus 614 may be classified into an address bus, a data bus, a control bus, and the like. For ease of representation, only one thick line is used to represent the bus in FIG. 6B, but this does not mean that there is only one bus or only one type of bus.

For exemplary implementations of the device shown in FIG. 6A or FIG. 6B, correspondingly refer to the related description of the embodiments shown in FIG. 1 to FIG. 5. Details are not described herein again.

Methods or algorithm steps described in combination with the content disclosed in this embodiment of the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read-only memory (EEPROM), a register, a hard disk, a mobile hard disk, a compact disc read-only memory (CD-ROM), or any other form of storage medium known in the art. For example, a storage medium is coupled to a processor, so that the processor can read information from the storage medium or write information into the storage medium. Further, the storage medium may be a component of the processor. The processor and the storage medium may be located in the ASIC. In addition, the ASIC may be located in a network device. Additionally, the processor and the storage medium may exist in the device as discrete components.

A person of ordinary skill in the art may understand that all or some of the processes of the methods in the embodiments may be implemented by a computer program instructing relevant hardware. The program may be stored in a computer readable storage medium. When the program is run, the processes of the embodiments in the methods are performed. The foregoing storage medium includes: any medium that can store program code, such as a ROM, a RAM, a magnetic disk, or an optical disc.

What is claimed is:

1. A script debugging method, comprising:
    obtaining a debugging instruction, wherein the debugging instruction carries a to-be-debugged target line breakpoint, and the target line breakpoint comprises at least line information used to indicate a line of code in which a breakpoint location is located in a script file requested to be debugged; and
    displaying a debugging result when determining that a breakpoint debugging condition is met, wherein the debugging result comprises information obtained by the debugger when the debugger performs breakpoint processing on the line of code corresponding to the target line breakpoint, the breakpoint debugging condition comprises at least that identification information corresponding to a target interface breakpoint is consistent with identification information corresponding to a target local variable, the target interface breakpoint is determined based on the target line breakpoint, and the target local variable is determined based on upper and lower lines of code that are associated with the target line breakpoint, and the target interface breakpoint is determined based on pre-stored target class information corresponding to the line of code in which the target line breakpoint is located, thereby enabling the debugger to convert the target line breakpoint into the target interface breakpoint.

2. The script debugging method according to claim 1, wherein the target interface breakpoint is a breakpoint that can be identified by a debug interface in the debugger.

3. The script debugging method according to claim 2, further comprising:
    creating an association relationship between a plurality of pieces of key information and a plurality of pieces of class information, wherein the plurality of pieces of key information are associated with a plurality of line breakpoints, the plurality of line breakpoints comprise at least the target line breakpoint, and the plurality of pieces of class information comprises at least the target class information.

4. The script debugging method according to claim 3, wherein the displaying of the debugging result when determining that the breakpoint debugging condition is met further comprises:
    traversing all line breakpoints in the script file;
    determining, when the target class information corresponding to the target line breakpoint is found, the identification information of the target local variable corresponding to the target line breakpoint; and
    displaying the debugging result when the identification information of the target local variable is consistent with the identification information of the target interface breakpoint.

5. The script debugging method according to claim 4, further comprising:
    creating a mapping relationship between the plurality of pieces of key information and a plurality of local variables, wherein the plurality of pieces of key information are associated with the plurality of line breakpoints, the plurality of line breakpoints comprise at least the target line breakpoint, and the plurality of local variables comprise at least the target local variable corresponding to the target line breakpoint.

6. The script debugging method according to claim 1, wherein the identification information comprises line information and/or ID information.

7. The script debugging method according to claim 1, wherein the debugging instruction comprises any one of: a breakpoint debugging instruction, a single-step debugging instruction, and a step in instruction.

8. The script debugging method according to claim 1, wherein the debugging result comprises at least one of: focal point location information, stack calling information, and local variable information; the focal point location information is used to indicate information about a line in which the target line breakpoint is located in the script file, the stack calling information is used to indicate information about a stack that needs to be called during debugging of the script file, the stack information comprises at least the line of code corresponding to the target line breakpoint, the local variable information comprises at least one local variable comprising the target local variable, and the local variable is calculated based on the line of code corresponding to the target line breakpoint and the upper and lower lines of code associated with the line of code.

9. The script debugging method according to claim 1, further comprising:
    resuming, when determining that the breakpoint debugging condition is not met, executing the script file starting from the line of code corresponding to the target line breakpoint.

10. A script debugging method, comprising:
    receiving a debugging trigger instruction, wherein the debugging trigger instruction carries a to-be-debugged target interface breakpoint, the target interface breakpoint is determined based on a to-be-debugged target line breakpoint, and the target line breakpoint comprises at least line information used to indicate a line of code in which a breakpoint location is located in a script file requested to be debugged; and displaying a debugging result when determining that a breakpoint debugging condition is met, wherein the debugging result comprises information obtained by the debugger when the debugger performs breakpoint processing on the line of code corresponding to the target line breakpoint, the breakpoint debugging condition comprises at least that identification information corresponding to the target interface breakpoint is consistent with identification information corresponding to a target local variable, the target interface breakpoint is determined based on the target line breakpoint, and the target local variable is determined based on upper and lower lines of code that are associated with the target line breakpoint, and the target interface breakpoint is determined based on pre-stored target class information corresponding to the line of code in which the target line breakpoint is located, thereby enabling the debugger to convert the target line breakpoint into the target interface breakpoint.

11. The script debugging method according to claim 10, further comprising:

obtaining a debugging instruction, wherein the debugging instruction carries the to-be-debugged target line breakpoint; and sending a debugging request instruction to a container connected to the debugger, wherein the debugging request instruction carries the target interface breakpoint, so that the container sends the debugging trigger instruction to the debugger when the container executes the script file to a breakpoint location corresponding to the target interface breakpoint.

12. The script debugging method according to claim 11, further comprising:

when the debugging instruction is a single-step debugging instruction, the debugging instruction further carries candidate debugging information associated with the target line breakpoint, and the debugging trigger instruction further carries a candidate interface breakpoint; wherein the candidate interface breakpoint is determined based on the candidate debugging information, and the candidate debugging information comprises at least line information of a next to-be-executed line of code associated with the target line breakpoint in the script file.

13. A debugging device, comprising:

a memory storage comprising computer-executable instructions; and a processor coupled to the memory storage, wherein the processor is configured to execute the computer-executable instructions to:

obtain a debugging instruction, wherein the debugging instruction carries a to-be-debugged target line breakpoint, and the target line breakpoint comprises at least line information used to indicate a line of code in which a breakpoint location is located in a script file requested to be debugged; and display a debugging result when determining that a breakpoint debugging condition is met, wherein the debugging result comprises information obtained by the debugging device when the debugging device performs breakpoint processing on the line of code corresponding to the target line breakpoint, the breakpoint debugging condition comprises at least that identification information corresponding to a target interface breakpoint is consistent with identification information corresponding to a target local variable, the target interface breakpoint is determined based on the target line breakpoint, and the target local variable is determined based on upper and lower lines of code that are associated with the target line breakpoint, and the target interface breakpoint is determined based on pre-stored target class information corresponding to the line of code in which the target line breakpoint is located, thereby enabling the debugging device to convert the target line breakpoint into the target interface breakpoint.

14. The debugging device according to claim 13, wherein the target interface breakpoint is a breakpoint that can be identified by a debug interface in the debugging device.

15. The debugging device according to claim 14, wherein the processor is configured to execute the computer-executable instructions to:

create an association relationship between a plurality of pieces of key information and a plurality of pieces of class information, wherein the plurality of pieces of key information are associated with a plurality of line breakpoints, the plurality of line breakpoints comprise at least the target line breakpoint, and the plurality of pieces of class information comprises at least the target class information.

16. The debugging device according to claim 15, wherein the processor is configured to execute the computer-executable instructions to:

traverse all line breakpoints in the script file, determine, when the target class information corresponding to the target line breakpoint is found, the identification information of the target local variable corresponding to the target line breakpoint, and display the debugging result when the identification information of the target local variable is consistent with the identification information of the target interface breakpoint.

17. The debugging device according to claim 16, wherein the processor is configured to execute the computer-executable instructions to:

create a mapping relationship between the plurality of pieces of key information and a plurality of local variables, wherein the plurality of pieces of key information are associated with the plurality of line breakpoints, the plurality of line breakpoints comprise at least the target line breakpoint, and the plurality of local variables comprise at least the target local variable corresponding to the target line breakpoint.

18. The debugging device according to claim 13, wherein the identification information comprises line information and/or ID information.

19. The debugging device according to claim 13, wherein the debugging instruction comprises any one of: a breakpoint debugging instruction, a single-step debugging instruction, and a step in instruction.

20. The debugging device according to claim 13, wherein the debugging result comprises at least one of: focal point location information, stack calling information, and local variable information; the focal point location information is used to indicate information about a line in which the target line breakpoint is located in the script file, the stack calling information is used to indicate information about a stack that needs to be called during debugging of the script file, the stack information comprises at least the line of code corresponding to the target line breakpoint, the local variable information comprises at least one local variable comprising the target local variable, and the local variable is calculated based on the line of code corresponding to the target line breakpoint and the upper and lower lines of code associated with the line of code.

\* \* \* \* \*